United States Patent [19]

Reiser

[11] Patent Number: 4,826,742

[45] Date of Patent: May 2, 1989

[54] WATER AND HEAT MANAGEMENT IN SOLID POLYMER FUEL CELL STACK

[75] Inventor: Carl A. Reiser, Glastonbury, Conn.

[73] Assignee: International Fuel Cells Corporation, South Windsor, Conn.

[21] Appl. No.: 203,622

[22] Filed: May 26, 1988

Related U.S. Application Data

[63] Continuation-in-part of Ser. No. 146,746, Jan. 21, 1988, abandoned.

[51] Int. Cl.[4] .............................................. H01M 8/06
[52] U.S. Cl. ........................................ 429/33; 429/26; 429/35
[58] Field of Search ............................. 429/30, 33–35, 429/38, 39, 12, 26

[56] References Cited

U.S. PATENT DOCUMENTS

| | | | |
|---|---|---|---|
| 3,418,168 | 12/1968 | Wentworth | 429/30 |
| 4,403,018 | 9/1983 | Alfenaar et al. | 429/34 |
| 4,537,840 | 8/1985 | Tsukui et al. | 429/35 X |
| 4,543,303 | 9/1985 | Danowitz et al. | 429/38 X |

Primary Examiner—Anthony Skapars

[57] ABSTRACT

Product water and proton transfer water are removed from the cathode side of a solid polymer fuel cell assembly and an absorbant oxygen flow field plate which contacts a wetproofed carbon paper sheet abutting the cathode side of the electrolyte polymer. Water droplets appearing on the outer surface of the paper sheet are absorbed into the flow field plate and then move laterally through the flow field plate to the edges thereof under the influence of the high pressure oxygen reactant gas in the oxygen flow field. A gas-sealing bubble barrier plate borders the oxygen flow field plate to allow passage of water, but prevent passage of oxygen, out of the oxygen flow field plate. Slots are formed in the bubble barrier plates to collect water from the oxygen flow field plates. In a stack of the cell assemblies, water passages communicate with the slots, and all of the plates carry water through the passages to the end of the stack where the water is ejected.

5 Claims, 5 Drawing Sheets

WATER AND HEAT MANAGEMENT IN SOLID POLYMER FUEL CELL STACK

This application is a continuation-in-part of application Ser. No. 146,746, filed Jan. 21, 1988, now abandoned.

DESCRIPTION

Technical Field

This invention relates to a solid polymer fuel cell power system, and more particularly to a passive water management system for a solid polymer fuel cell stack.

BACKGROUND ART

Fuel cells which include a solid polymer electrolyte membrane are known in the prior art. This type of fuel cell operates best when the electrolyte membrane is kept moist with water because the membrane will not operate efficiently when it is dry. During operation of the cells, water is dragged through the membrane from the anode side to the cathode side along with proton movement through the membrane. This phenomenon tends to dry the anode side of the membrane, and also tends to create a water film on the cathode surface of the membrane. The cathode surface will be further wetted by product water which is formed in the electrochemical reaction and appears on the cathode surface. Thus water must be supplied to the anode side of the membrane to prevent drying, but water must be removed from the aathode side to prevent a film of water from forming on the membrane surface which blocks access of the oxygen reactant to the membrane. In order to ensure that oxygen can flow through to the cathode surface of the membrane, a wetproofed sheet of carbon paper is juxtaposed to the cathode surface of the membrane. The paper sheet is porous so as to allow oxygen to diffuse through to the membrane, but the wetproofing causes the water which appears on the cathode surface to be unable to wet the paper. The water thus tends to flow through the paper along restricted flow paths, and beads up on the outside surface of the paper remote from the membrane. In the prior art this beaded water was wicked off of the paper by a fibrous wick which extended around the edges of the paper and led to a porous ceramic block. The stack of the prior art thus included a fibrous wick for each cell and the porous ceramic block common to all the cells which held the water. This arrangement makes edge sealing of the cells very difficult, thus there was frequent reactant crossover at the cell margins with resultant fires.

DISCLOSURE OF THE INVENTION

The cell and stack construction of this invention ensures that water which appears on the cathode surface of the cells will be drawn off of the wetproofed paper layer by porous oxygen flow field plates abutting the paper layer. Separator plates interposed between each cell assembly in the stack are impervious to the water in the oxygen flow field plate. Reactant pressure in the oxygen stream forces the water in the oxygen flow field plates to move laterally in plane in the plates to the margins thereof. Reactant sealing bubble barrier plates are disposed at the marginal edges of the cell plates to prevent reactant crossover. These bubble barrier seals are porous plates whose pores are filled with water. Water conduits are formed integrally in the cell plate structures outwardly adjacent to the bubble barrier seals. The water in the oxygen flow field plates is forced by oxygen reactant pressure into the bubble barrier seals and thence into the water conduits where the water is removed from an end of the stack through drain pipes which communicate with the internal water conduits. The stack is cooled by intermittent carbon cooling plates which carry heat outward to the edges of the stack to cooling fins or the like mounted on the sides of the stack.

It is therefore an object of this invention to provide an improved solid polymer electrolyte fuel cell system which uses passive water management to remove product water from the cells.

It is a further object of this invention to provide a fuel cell system of the character described wherein product water is removed from the cathode side of each cell so as to prevent smothering of the cathode by product water collecting on the surface of the electrolyte membranes.

It is another object of this invention to provide a fuel cell system of the character described wherein product water is removed from the cells through the lateral gas seals in the cells.

It is an additional object of this invention to provide a fuel cell system of the character described wherein the product water is carried away from the electrolyte membrane by a porous cell plate component and moved through bubble barrier seals by means of reactant gas pressure in the cathode side of the cells.

These and other objects and advantages of the invention will become more readily apparent from the following detailed description of a preferred embodiment thereof, when taken in conjunction with the accompanying drawings, in which:

BEST MODE FOR CARRYING OUT THE INVENTION

Figure 1:
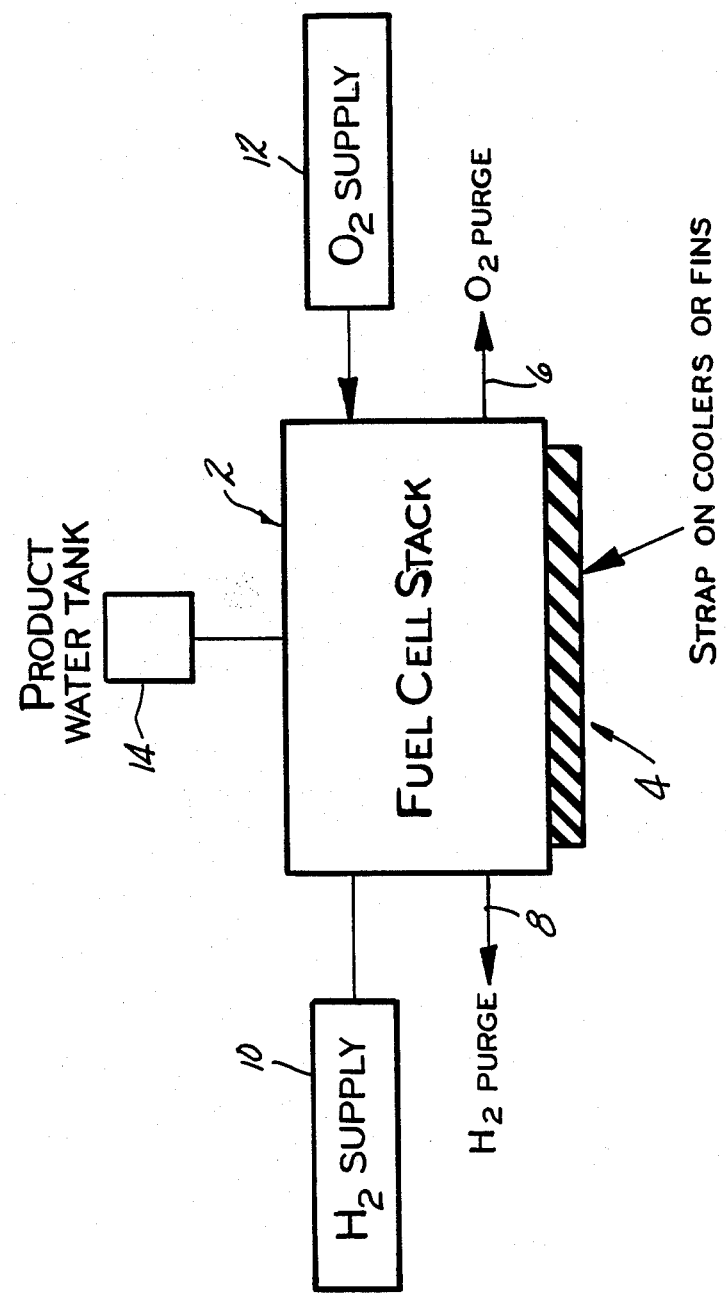
FIG. 1 is a schematic view of a preferred embodiment of the fuel cell system of this invention.

Referring now to the drawings, there is shown in FIG. 1 a schematic representation of the fuel cell power plant of this invention. The power plant which is a compact assembly suitable for use in the form of a backpack for space station applications or the like, includes a stack 2 which is cooled by strap-on coolers or fins 4 or the like. The stack 2 has reactant purge outlets 6 and 8 for use in start up. The outlets 6 and 8 are typically closed during extended operation of the system. Reactant supply tanks 10 and 12 will be located externally of the stack 2. The tanks 10 and 12 can be carried about in a sling or the like and hooked up to the stack 2 whenever the need to use the power plant occurs. The power plant thus is a portable system which can be used in space applications. The reactants can be derived from onboard electrolysis cells which are run by solar panels. A tank 14 is provided to receive the product water formed by the chemical reaction. This product water will be returned to the electrolysis cells for reconversion to hydrogen and oxygen. It will be noted that the system is completely passive and requires no moving parts (except for the purge valves which can be operated manually) to produce electrical power. Reactant and water flow is accomplished by reactant pressure.

Figure 2:
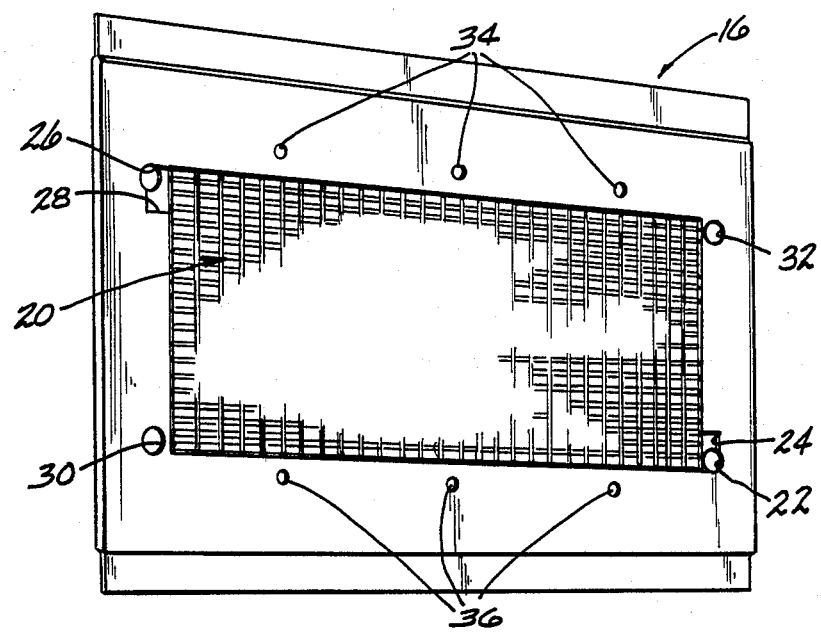
FIG. 2 is a perspective view of a anode flow field plate of a cell formed in accordance with this invention.
Figure 3:
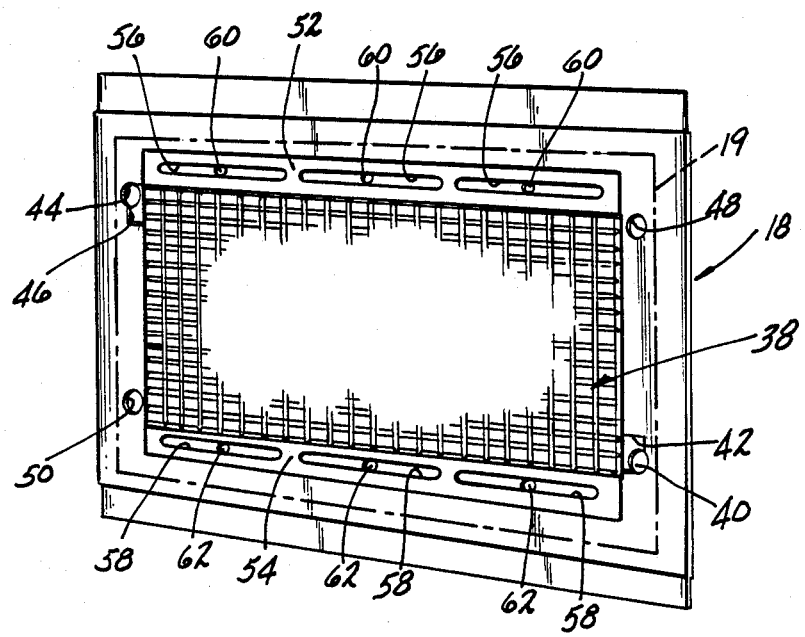
FIG. 3 is a perspective view of a cathode flow field plate of a cell operating in accordance with this invention.

Referring to FIGS. 2 and 3, there are shown the anode and cathode reactant flow field plates, denoted generally by the numerals 16 and 18, respectively. It will be understood that the surfaces of the plates 16 and 18 which are shown in FIGS. 2 and 3 each face the electrolyte membrane which will be interposed between the plates 16 and 18 in the assembled cells. The extent of the electrolyte membrane is shown by the phantom line 19 in FIG. 3. The anode plate 16 is formed from a pressed, sintered and graphitized mixture of carbon particles and binder. The plate 16 includes a central flow field portion 20 which has a network of lands and grooves. A hydrogen inlet passage 22 is formed with an adjacent notch 24 to allow hydrogen flowing through the inlet passage 22 to permeate the flow field portion's grooves. A hydrogen outlet passage 26 and notch 28 are disposed diagonally opposite the inlet passage 22 for use only during the initial purging of the anode side of the stack 2. Once purged, the hydrogen side of the stack 2 is dead-ended. Oxygen flow passages 30 and 32 are also included in opposite corners of the anode plate 16. On each side of the flow field portion 20 there are provided a plurality of water flow passages 34 and 36 through which product water flows out of the cathode sides and out of the stack 2 to the product water tank 14.

The cathode plate 18 also has a central flow field portion 38 formed with a network of grooves and lands. An oxygen inlet passage 40 with associated notch 42 is disposed in one corner of the plate 18, and an oxygen outlet passage 44 with associated notch 46 is disposed in the diagonally opposite corner of the plate 18. The passage 40 registers with the passage 30 in the plate 16, while the passages 44 and 32 also register with each other when the plates 16 and 18 are assembled to form a cell. Hydrogen passages 48 and 50 are also included in opposite corners of the plate 18. At opposite edges of the flow field portion 38 there are disposed porous bubble barrier seal areas 52 and 54. These areas are filled with water to form a seal to prevent the reactant gases from diffusing through the edges of the plate 18. This prevents reactant combustion from occurring. A plurality of slots 56 and 58 are disposed in the seal areas 52 and 54, respectively. The slots 56 and 58 collect product water migrating through the bubble barrier seal areas 52 and 54, and the passages 56 and 58 align with the passages 34 and 36 to provide passageways through the stack for drawing product water therefrom. It will be noted from FIG. 3 that the margin 19 of the membrane extends beyond all of the openings in the plates 16 and 18, thus the membrane will also require matching openings to be formed therein.

Figure 4:
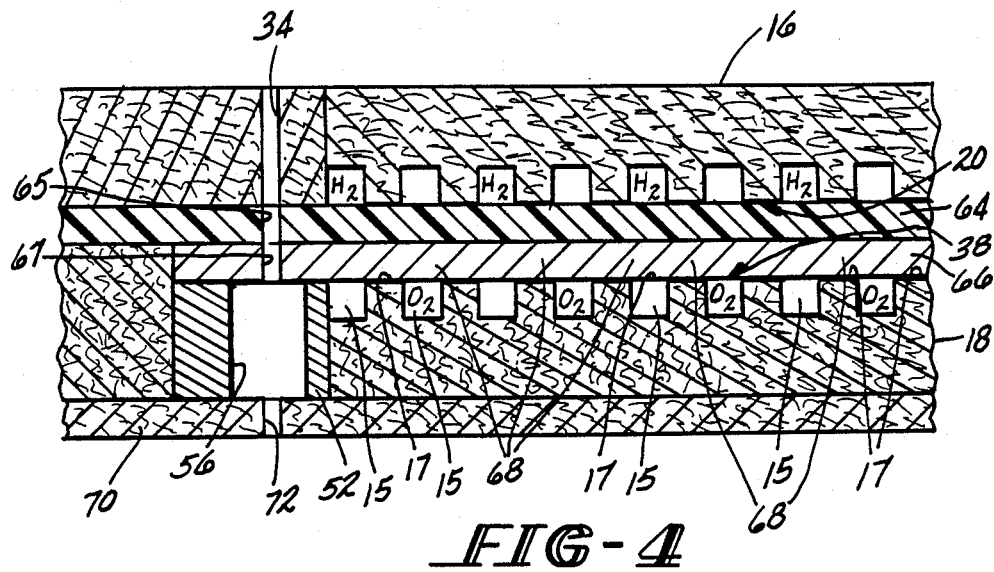
FIG. 4 is a fragmented sectional view of one of the cell subassemblies perpendicular to an edge thereof.

Referring now to FIG. 4, there is shown a cross section of one of the cell structures utilizing the invention. As is shown, the electrolyte membrane 64 is sandwiched between the flow field plates 16 and 18. A wet-proofed carbon paper sheet 66 is interposed between the cathode surface of the membrane 64 and the cathode flow field plate 18. The paper sheet 66 has a number of internal water flow paths 68 which are formed as the cell operates, by the pressure of the water appearing on the cathode surface of the membrane 64. Water is thus drawn away from the cathode surface of the membrane 64 via the flow paths 68 to the lands 17 on the cathode flow field plate 18. The paper 66 is sufficiently porous so that oxygen can diffuse from the grooves 15 to the plate 18 through the paper 66 to the cathode surface of the membrane 64. Thus product water flows through the paper layer 66 in one direction while oxygen flows through the layer 66 in the other direction. The water is absorbed into the plate 16 from the surface of the paper 66 through the lands 17. The water which is entrained in the plate 16 is pumped outwardly through the plates 16 by the pressurized oxygen in the flow field. The oxygen pressure is preferably maintained at a pressure differential of about 15 psi above the product water tank pressure, but the pressure differential can vary between about 10 psi and about 35. As previously noted, the water collects in the grooves 56 and exits the stack via the passages 34, 60. The membrane 66, as noted also has water passages 65, and the paper layer 66 has aligned water passages 67.

The plate 70 is a dense carbon cooler/separator plate which is also provided with all of the necessary passage ports, one of which is a water drain passage 72. There will be one such plate 70 between each cell assembly to prevent reactant crossover between adjacent cells, and to conduct heat outwardly through the stack 2 to the external coolers 4.

Figure 6:
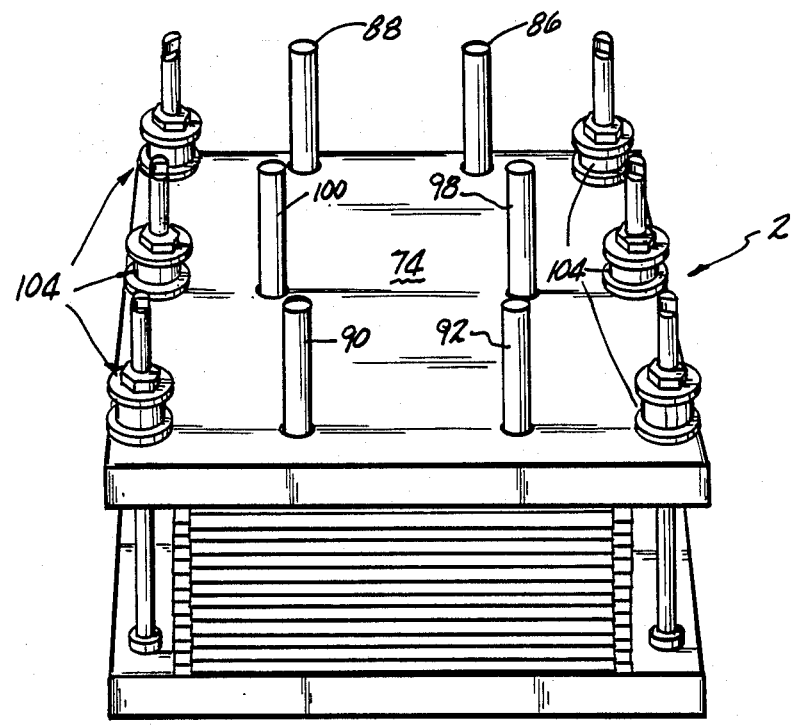
FIG. 6 is a perspective view of a stack utilizing cell structure formed in accordance with this invention.
Figure 5:
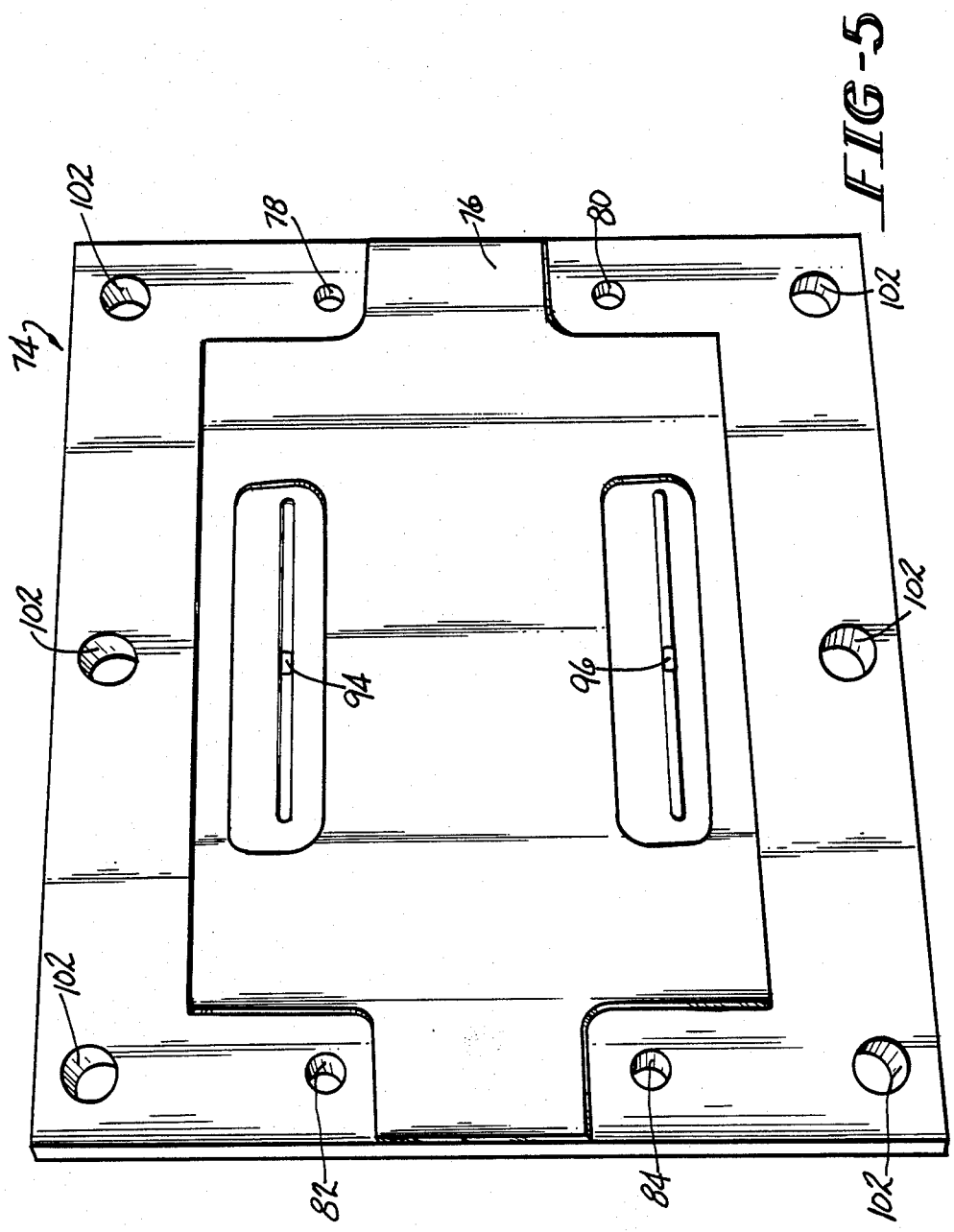
FIG. 5 is a perspective view of one of the end plates used in a cell stack formed in accordance with this invention.

Referring to FIGS. 5 and 6, the end cover plate of the stack 2 is shown. The plate, designated generally by the numeral 74, is shown looking at its inside surface in FIG. 5, and is shown from the outside on the stack 2 in FIG. 6. The plate 74 is provided with an inner rubber pad 75 for sealing against any water which may form adjacent to the plate 74. The openings 78, 80, 82 and 84 receive the reactant feed lines 86, 88, 90 and 92, respectively, as shown in FIG. 6. The openings 94 and 96 receive water drainage pipes 98 and 100 shown in FIG. 6. The openings 102 in the plate 74 receive tie rod assemblies 104 as shown in FIG. 6.

Figure 7:
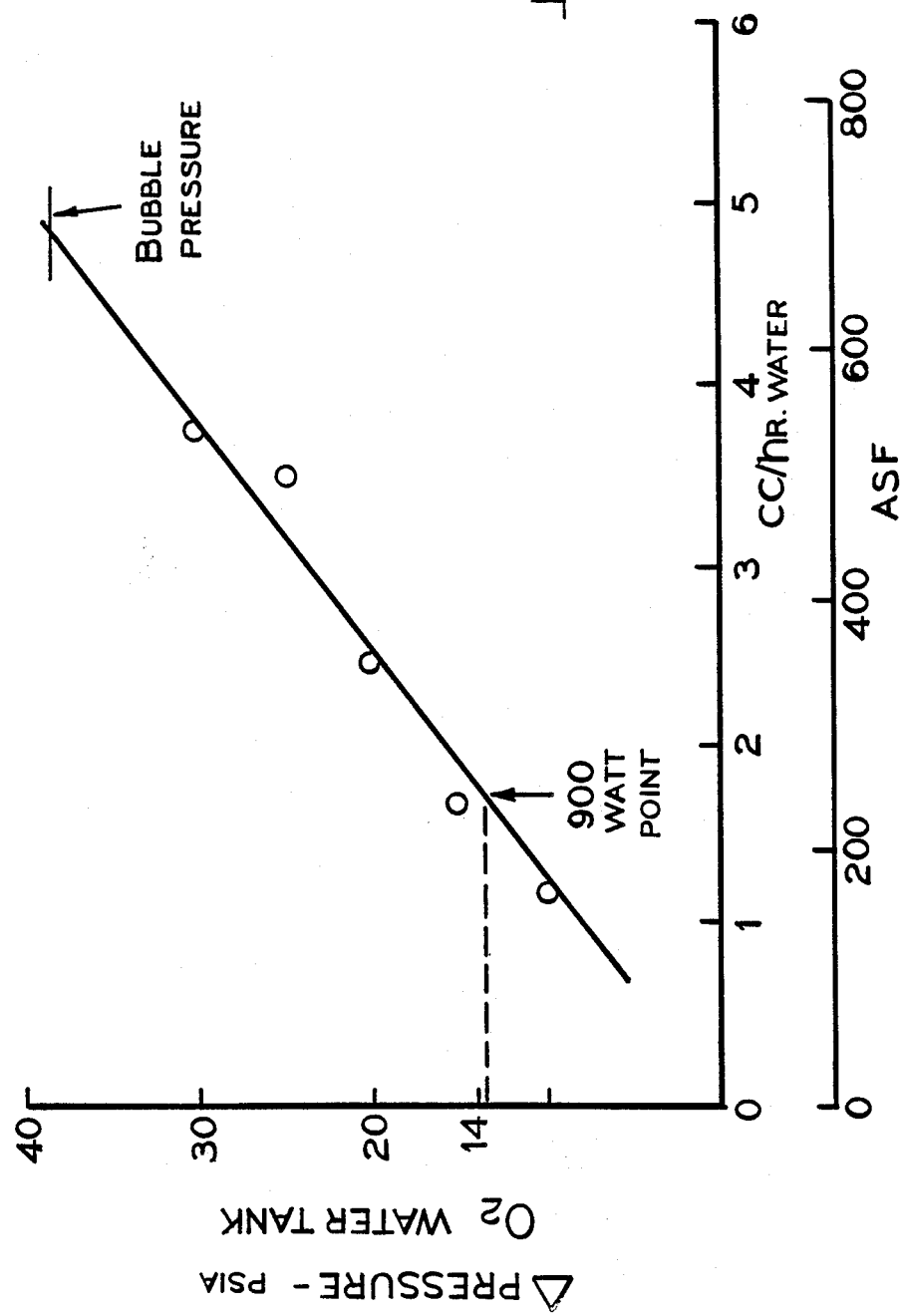
FIG. 7 is a plot showing the oxygen pressure differential as a function of cell current and product water volume.

FIG. 7 is a plot of amps per square foot and cubic centimeters of water produced per hour, equated to the pressure differential between the oxygen reactant in the stack and the water tank. The built-in bubble pressure is also noted on the graph. FIG. 7 shows that satisfactory current can be achieved by the system, and the product water can be removed, while maintaining the bubble barrier gas seal at the edge of the stack.

It will be readily appreciated that the stack of this invention is readily adaptable to use as a portable electrical energy source in a space application or the like. The stack operates without any moving parts, save the purge valves, relying on gas pressure to move product water out of the active cell area. Conventional bubble barrier technology can be used to form gas seals at the edges of the cells through which seals water can be pumped.

Since many changes and variations of the disclosed embodiment of the invention may be made without departing from the inventive concept, it is not intended to limit the invention otherwise than is required by the appended claims.

What is claimed is:

1. A stack of solid polymer fuel cells, said stack comprising:
   (a) a plurability of fuel cells stacked one atop the other and each comprising a solid polymer electrolyte membrane; a hydrogen flow field plate on an anode side of said membrane and an oxygen flow field plate on a cathode side of said membrane, each of said oxygen flow field plate being permeable to water flow;
   (b) porous gas sealing plate means forming a water filled barrier to reactant gas passage, said barrier surrounding each of said oxygen flow field plates and abutting marginal edges of the latter;
   (c) said oxygen flow field plates being operable to remove water from a surface of porous carbonized wetproofed paper sheets abutting the cathode surface of said membranes, and being operable by reason of oxygen reactant pressure to pass the removed water into said porous gas sealing plate means; and
   (d) water passageway means in the stack communicating with all of said porous gas sealing plate means and operable to duct water from said porous gas sealing plate means to an end of the stack for removal therefrom.

2. The stack of claim 1, wherein said membranes extend beyond the margin of said hydrogen and oxygen flow field plates, and include apertures forming a part of said water passageway means, which apertures are edge sealed by the membrane material.

3. The stack of claim 2, wherein said water passageway means is formed by a plurality of aligned apertures formed in margins of the stack and by slots formed in the porous gas sealing plate means aligned with said apertures.

4. The stack of claim 3, comprising a gas impervious separator plate interposed between each cell and the cells adjacent there to.

5. The stack of claim 4, further comprising a plurability a carbon heat-conducting plates interspersed throughout said stack and operable to conduct heat from the cells in said stack to heat dissipating means on an outside surface of said stack.

* * * * *